(12) United States Patent
Schneider (10) Patent No.: US 8,812,858 B2
(45) Date of Patent: Aug. 19, 2014

(54) BROADCAST STENOGRAPHY OF DATA COMMUNICATIONS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1566 days.

(21) Appl. No.: 12/074,034

(22) Filed: Feb. 29, 2008

(65) Prior Publication Data
US 2009/0220081 A1 Sep. 3, 2009

(51) Int. Cl.
*H04L 9/32* (2006.01)
*H04K 1/02* (2006.01)
*H04L 29/06* (2006.01)
*H04L 9/08* (2006.01)

(52) U.S. Cl.
CPC ............ *H04L 63/08* (2013.01); *H04L 63/0435* (2013.01); *H04L 9/0811* (2013.01); *H04L 9/3247* (2013.01)
USPC ............................. 713/181; 380/255; 713/168

(58) Field of Classification Search
USPC ........................................................ 380/255
See application file for complete search history.

(56) References Cited

U.S. PATENT DOCUMENTS

| | | | |
|---|---|---|---|
| 5,500,897 A | 3/1996 | Hartman | |
| 6,021,203 A * | 2/2000 | Douceur et al. | 380/252 |
| 6,343,281 B1 * | 1/2002 | Kato | 705/57 |
| 6,449,473 B1 | 9/2002 | Raivisto | |
| 6,907,473 B2 * | 6/2005 | Schmidt et al. | 709/248 |
| 6,948,661 B2 * | 9/2005 | Silverbrook et al. | 235/462.1 |
| 7,140,726 B2 * | 11/2006 | Silverbrook | 347/101 |
| 7,234,059 B1 | 6/2007 | Beaver et al. | |
| 7,330,838 B2 * | 2/2008 | Rogers et al. | 705/64 |
| 7,770,032 B2 * | 8/2010 | Nesta et al. | 713/194 |
| 7,848,517 B2 * | 12/2010 | Britz et al. | 380/33 |
| 7,992,006 B2 * | 8/2011 | She | 713/182 |
| 2002/0087729 A1 * | 7/2002 | Edgar | 709/246 |
| 2003/0005284 A1 | 1/2003 | Euchner | |
| 2003/0126091 A1 * | 7/2003 | Rogers et al. | 705/64 |
| 2004/0003116 A1 * | 1/2004 | Munger et al. | 709/245 |
| 2004/0015999 A1 * | 1/2004 | Carlucci et al. | 725/136 |

(Continued)

OTHER PUBLICATIONS

RSA Laboratories, "What is Diffie Hellman?" May 6, 2007, 2 pages www.rsa.com/rsalabs/node.asp?id=2248, from Internet Archive Wayback Machine.

(Continued)

*Primary Examiner* — Fatoumata Traore
(74) *Attorney, Agent, or Firm* — Lowenstein Sandler LLP (57) ABSTRACT

In one embodiment, a mechanism for broadcast stenography of data communications is disclosed. In one embodiment, a method includes creating a plurality of messages for transmission to one or more recipients, the plurality of messages including one or more real messages intended for one or more of the recipients and one or more bogus messages intended for none of the recipients. The method further includes for each intended recipient of the one or more real message, calculating a message authentication code (MAC) based on the message and a shared secret key kept between a broadcaster of the plurality of messages and the intended recipient, and for each of the plurality of messages, creating a plurality of unique pseudo-MACs that have an identical format to a real MAC. In addition, the method includes sending the plurality of messages to the one or more recipients, with the calculated MACs for each intended recipient attached to the one or more real message and the associated unique pseudo-MACs attached to each message of the plurality of messages. Other embodiments are also described.

25 Claims, 5 Drawing Sheets

(56) References Cited

U.S. PATENT DOCUMENTS

| | | | |
|---|---|---|---|
| 2004/0098485 A1* | 5/2004 | Larson et al. | 709/227 |
| 2004/0107285 A1* | 6/2004 | Larson et al. | 709/229 |
| 2004/0107286 A1* | 6/2004 | Larson et al. | 709/229 |
| 2005/0097569 A1 | 5/2005 | Chandrasekaran | |
| 2005/0166046 A1* | 7/2005 | Bellovin et al. | 713/165 |
| 2005/0246546 A1* | 11/2005 | Takagi et al. | 713/182 |
| 2006/0123134 A1* | 6/2006 | Munger et al. | 709/245 |
| 2006/0209766 A1* | 9/2006 | Britz et al. | 370/335 |
| 2006/0274856 A1* | 12/2006 | Dunn et al. | 375/316 |
| 2007/0035566 A1* | 2/2007 | Silverbrook | 347/2 |
| 2007/0237145 A1 | 10/2007 | Adhikari et al. | |
| 2007/0260879 A1* | 11/2007 | Dzung | 713/163 |
| 2007/0288768 A1* | 12/2007 | Nesta et al. | 713/194 |
| 2008/0016549 A1* | 1/2008 | Smithson | 726/1 |
| 2008/0022174 A1* | 1/2008 | Bancel et al. | 714/726 |
| 2008/0040791 A1* | 2/2008 | Munger et al. | 726/14 |
| 2008/0040792 A1* | 2/2008 | Larson et al. | 726/14 |
| 2008/0123124 A1* | 5/2008 | Smithson | 358/1.13 |
| 2008/0209214 A1* | 8/2008 | Schrijen et al. | 713/169 |
| 2008/0216168 A1* | 9/2008 | Larson et al. | 726/15 |
| 2009/0044025 A1* | 2/2009 | She | 713/193 |
| 2009/0063850 A1* | 3/2009 | Joram et al. | 713/155 |

OTHER PUBLICATIONS

Red Hat, Inc. Office Action for U.S. Appl. No. 12/074,006 mailed Mar. 22, 2011.

Red Hat, Inc. Final Office Action for U.S. Appl. No. 12/074,006 mailed Jul. 13, 2011.

Red Hat, Inc. Office Action for U.S. Appl. No. 12/074,092 mailed Jan. 24, 2011.

Red Hat, Inc. Final Office Action for U.S. Appl. No. 12/074,092 mailed Apr. 11, 2011.

Red Hat, Inc. Office Action for U.S. Appl. No. 12/074,092 mailed Sep. 30, 2011.

Red Hat, Inc. Advisory Action for U.S. Appl. No. 12/074,006 mailed Sep. 27, 2011.

USPTO, Notice of Allowance for U.S. Appl. No. 12/074,006 mailed Jul. 20, 2012.

USPTO, Notice of Allowance for U.S. Appl. No. 12/074,092 mailed Jan. 25, 2012.

* cited by examiner

BROADCAST STENOGRAPHY OF DATA COMMUNICATIONS

TECHNICAL FIELD

The embodiments of the invention relate generally to data communications and, more specifically, relate to broadcast stenography of data communications.

BACKGROUND

Data communications suffer from the weakness of intentional invasion by snoopers and other third party interlopers. Even in cases where data communications are encrypted using some secure mechanism, such as Secure. Sockets Layer (SSL), it is still possible for traffic analysis to be conducted where both endpoints of the communications and how much traffic is passed between them may be determined. This is information that the endpoints may not have wanted to be public. In addition, some data communications may operate in environments where certain types of cryptography and ciphering are not a legal alternative for implementation.

Some conventional techniques for protection of broadcast data communication schemes generally present a few problems with data security. One problem is that the end points of the data communication cannot reliably authenticate who they are speaking with. Another problem is that the information contained within the data communication may be disclosed to parties whom the endpoints do not want to see the information.

In light of the above problems, a way to ensure that broadcast of data communications are not vulnerable to traffic analysis schemes as described above would be beneficial. In addition, such a solution would be beneficial if it allowed for the reliable authentication of the end points of the data communication, as well as if it provided for the security of the information within the data communication.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for broadcast stenography of data communications. In one embodiment, a method of broadcast stenography includes creating a plurality of messages for transmission to one or more recipients, the plurality of messages including one or more real messages intended for one or more of the recipients and one or more bogus messages intended for none of the recipients. The method further includes for each intended recipient of the one or more real message, calculating a message authentication code (MAC) based on the message and a shared secret key kept between a broadcaster of the plurality of messages and the intended recipient, and for each of the plurality of messages, creating a plurality of unique pseudo-MACs that have an identical format to a real MAC. In addition, the method includes sending the plurality of messages to the one or more recipients, with the calculated MACs for each intended recipient attached to the one or more real message and the associated unique pseudo-MACs attached to each message of the plurality of messages.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
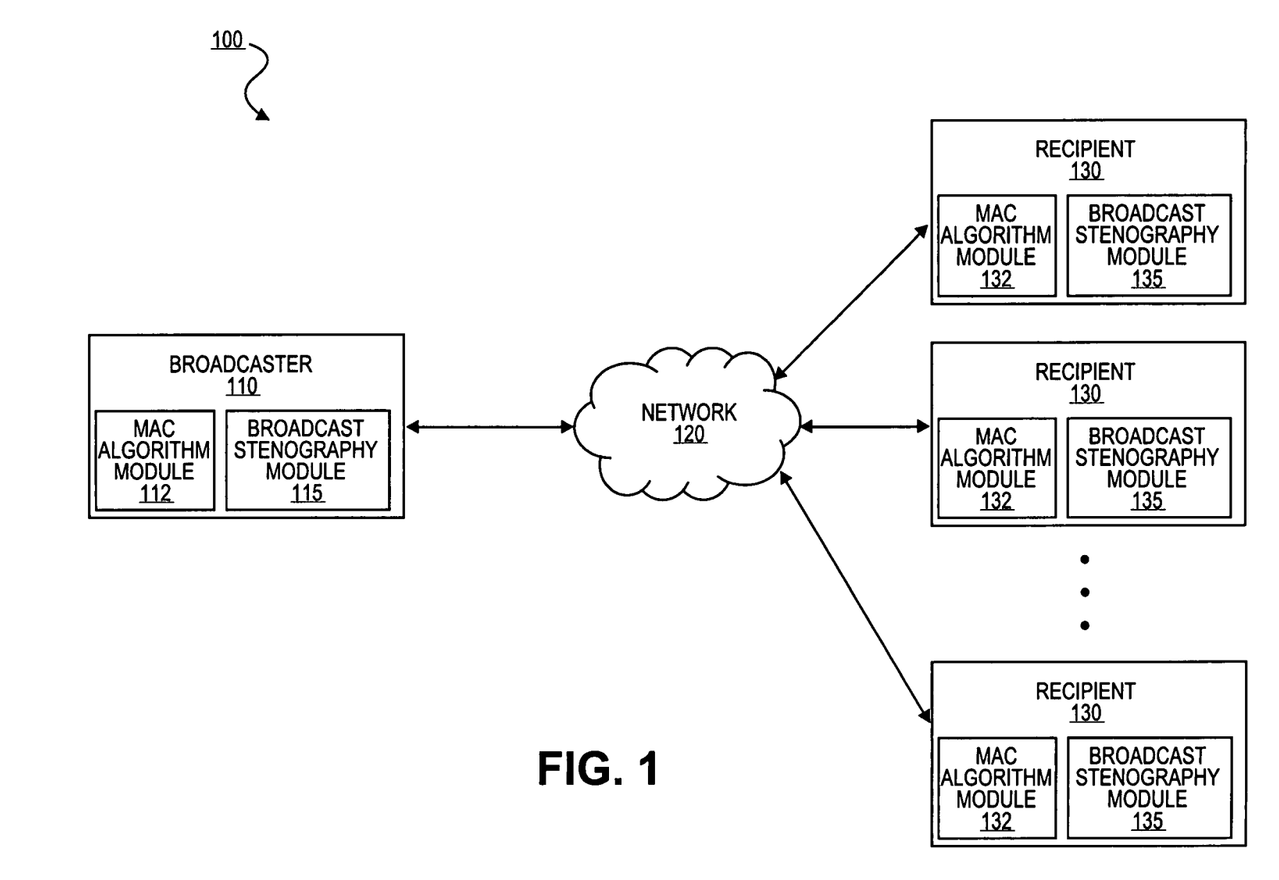
FIG. 1 is a block diagram of an exemplary network architecture in which embodiments of the invention may be implemented.

FIG. 1 is a block diagram of an exemplary network architecture in which embodiments of the invention may be implemented. The network architecture system 100 includes a broadcaster 110 and a plurality of recipients 130 coupled by a network 120. Network 120 may be a public network (e.g., Internet) or a private network (e.g., Ethernet or a Local Area Network (LAN)). In one embodiment, each of the broadcaster 110 and recipients 130 is a computing system that engages in data communications. In some embodiments, broadcaster 110 sends out multicast or simulcast communications to each of the recipients 130 at the same time. In other embodiments, broadcaster 110 may communicate with each recipient 130 in a unicast fashion. In yet other embodiments, broadcaster 110 and recipients 130 may be participating in a peer-to-peer data communication arrangement.

In one embodiment, broadcaster 110 includes a message authentication code (MAC) module 112, while recipients 130 each also include Mac algorithm modules 132. In addition, broadcaster 110 includes a broadcast stenography module 115 and recipient(s) 130 each include a broadcast stenography module 135. In some embodiments, broadcast stenography module 115 and broadcast stenography module 135 are the same. In one embodiment, MAC algorithm modules 112, 132 and broadcast stenography modules 115, 135 enable broadcaster 110 and recipients 130 to engage in an anonymous, yet authenticated, message passing service using broadcast stenography as described in embodiments of the invention below. In particular, the broadcaster 110 may broadcast a continuous stream of message traffic, signed in such a way that the intended recipients can easily determine which messages are intended for them, but no other actor can determine which messages are intended for any other particular recipient.

Figure 2:
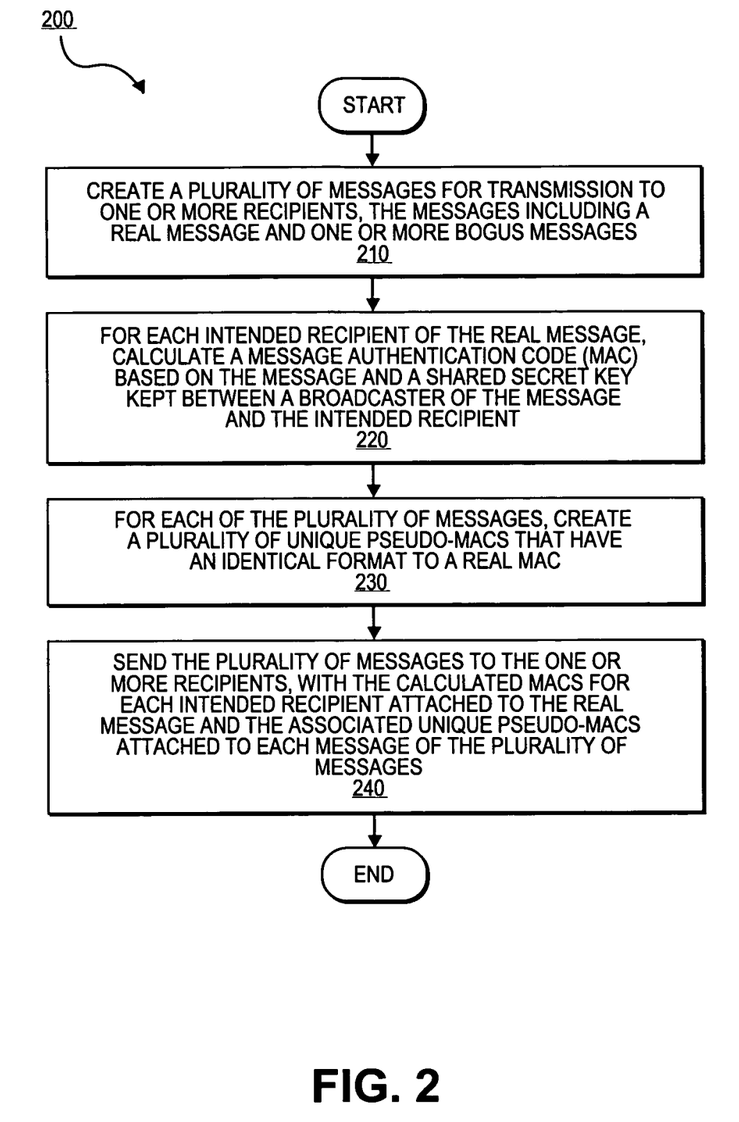
FIG. 2 is a flow diagram depicting one embodiment of a broadcast stenography process performed by a broadcaster.

FIG. 2 is a flow diagram depicting one embodiment of a broadcast stenography method 200 performed by a broadcaster. Method 200 may be performed by processing logic at a broadcaster that may comprise hardware (e.g., circuitry, dedicated logic, programmable logic, microcode, etc.), software (such as instructions run on a processing device), or a combination thereof. In one embodiment, method 200 is performed by the broadcast stenography module 115 of FIG. 1. The broadcaster of method 200 may be broadcaster 110 communicating with one or more recipients 130 via a network 120, described with respect to FIG. 1.

Method 200 begins with block 210, where the broadcaster creates a plurality of messages for transmission to the one or more recipients. These messages include a real or authentic message that is intended for the one or more of the recipients, as well as multiple bogus messages that have no intended recipients. These bogus messages may be constructed in such a way as to look as if they are real or authentic messages.

Then, method 200 proceeds to block 220, where for each intended recipient of the real message, a MAC is calculated. In one embodiment, the MAC algorithm modules 112 and 132 of FIG. 1 may be utilized to perform this function. The MAC may be calculated utilizing a MAC algorithm with the inputs of the message itself and a shared secret key that is kept between the broadcaster and the intended recipient. In some embodiments, the MAC algorithm is an algorithm previously agreed upon between the broadcaster and each recipient. The shared secret key is a public-private key pair such that the private key of one actor and the public key of another can be combined to create a key the two actors will share. This shared secret key is unique between the broadcaster/recipient pair and is only known by the pair. In some embodiments, a message may be sent to multiple recipients, and as such, this message may have multiple MACs calculated which are unique to each of the intended recipients.

In one embodiment, the shared secret key is created using a Diffie Hellman key exchange protocol. The Diffie Hellman key exchange protocol is a cryptographic protocol that allows two parties that have no prior knowledge of each other to jointly establish a shared secret key over an insecure communications channel. This key can then be used to encrypt subsequent communications using a symmetric key cipher. One skilled in the art should have knowledge of how to establish a shared secret key using Diffie Hellman key exchange protocol. In yet other embodiments, other cryptographic protocols may be utilized to establish a shared secret key.

At block 230, for each message, the broadcaster creates pseudo-MACs. These pseudo-MACs are fake message authentication codes (MACs) that are in an identical format to the real MACs calculated in block 220. Finally, at block 240, the broadcaster sends the messages to the one or more recipients. In some embodiments, the messages are sent to all of the recipients simultaneously, although this is not required. In addition, the message may be encrypted in some embodiments.

At block 240, the calculated MACs for the real messages are attached to the real messages. The pseudo-MACS that were created at block 230 are attached to all of the messages being sent. In summary, the real messages will be sent out not only with the real MACs that were calculated for the intended recipients, but also with the pseudo-MACs. The bogus messages will only be sent out with the pseudo-MACs attached.

Figure 3:
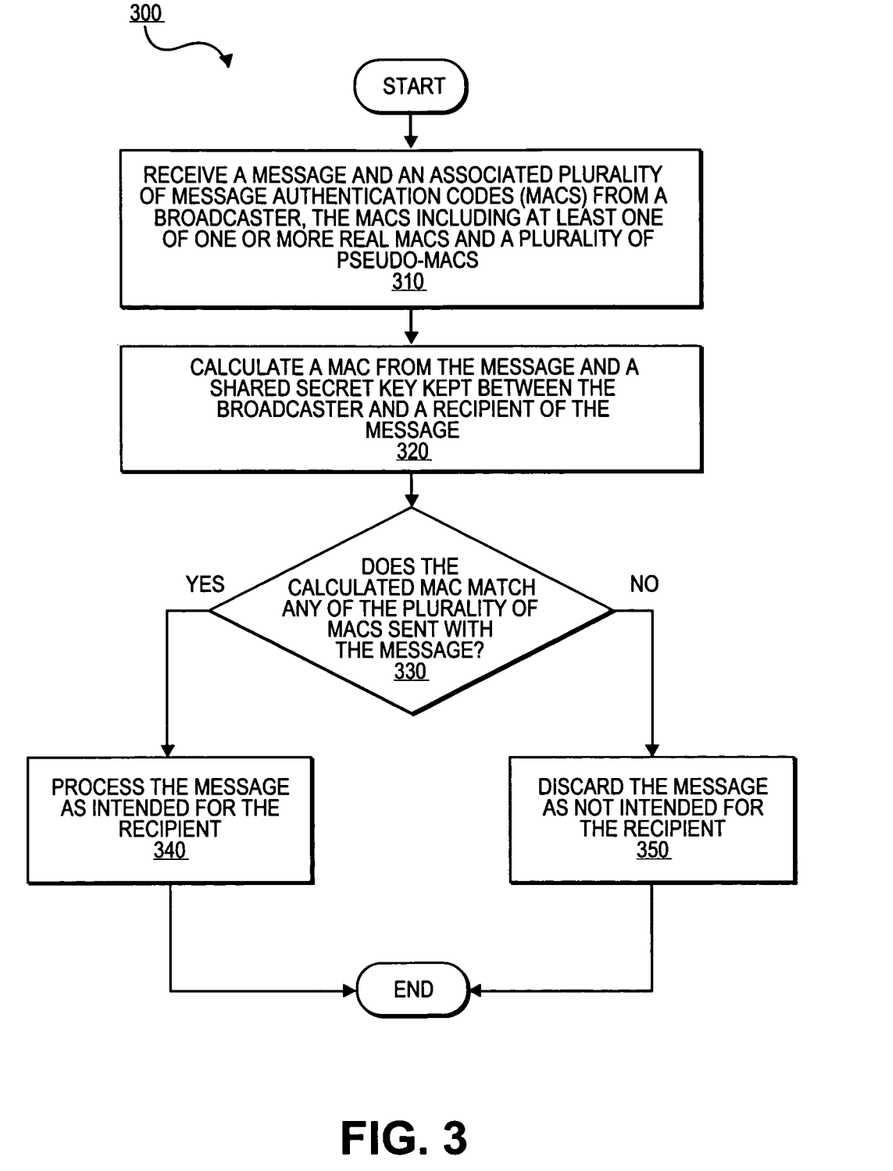
FIG. 3 is a flow diagram depicting one embodiment of a broadcast stenography process performed by a recipient.

FIG. 3 is a flow diagram depicting one embodiment of a broadcast stenography method 300 performed by a recipient. Method 300 may be performed by processing logic at a recipient that may comprise hardware (e.g., circuitry, dedicated logic, programmable logic, microcode, etc.), software (such as instructions run on a processing device), or a combination thereof. In one embodiment, method 300 is performed by the broadcast stenography module 135 of FIG. 1. The recipient of method 300 may be recipient 130 communicating with broadcaster 110 via network 120, as described with respect to FIG. 1.

Method 300 begins at block 310 where the recipient receives a message and associated MACs from a broadcaster. The MACs may include one or more real MACs, as well as pseudo-MACs. The real MACs and pseudo-MACs are the same as those described above with respect to FIG. 2.

Then, at block 320, the recipient calculates a MAC utilizing a MAC algorithm with the inputs of the message and a shared secret key kept between the recipient and the broadcaster. The shared secret key is the same as that described above with respect to FIG. 2. At decision block 330, the recipient determines whether the calculated MAC matches any of the MACs which were sent with the message. If so, then at block 340, the message is processed as intended for the recipient. If not, then at block 350, the message is discarded as not intended for the recipient.

In some embodiments, to guard against replays, the recipient may keep a record of the MACs of messages they have accepted. In cases where the broadcaster may want to send the same message as previously sent, each message should have a unique identifier.

In yet another embodiment, instead of discarding messages at block 350, the recipient could store the messages for some time period. If the recipient runs out of storage space, the messages may be discarded based upon, for example, a first-in-first-out (FIFO) system. Then, the broadcaster could refer to these messages at a later point in time by creating an otherwise bogus message, and attaching a MAC of the referenced message. In one embodiment, the broadcaster may create the MAC over the entire message and its associated pseudo-MACs. However, this is not required.

One concrete example of this embodiment is discussed below. Assume that the broadcaster sends the following messages, all initially assumed to be bogus messages, to a recipient:
1) horse
2) 3, 7, 4
3) go
4) operation
5) defend
6) 4, 1, 7, 10, 3
7) is
8) 10, 3, 1, 5, 2
9) overlord
10) a Then, at a later point, the broadcaster sends one or more messages with associated MACs over the entirety of messages 1, 3, 4, 7, 10, and 6 (in that order). At this point, the recipient could interpret this transmission as "operation [4] horse [1] is [7] a [10] go [3]", where the numbers in brackets correspond to the contents of message 6. In one embodiment, to keep storage requirements to a minimum, the recipients may just store the message and the MAC.

Figure 4:
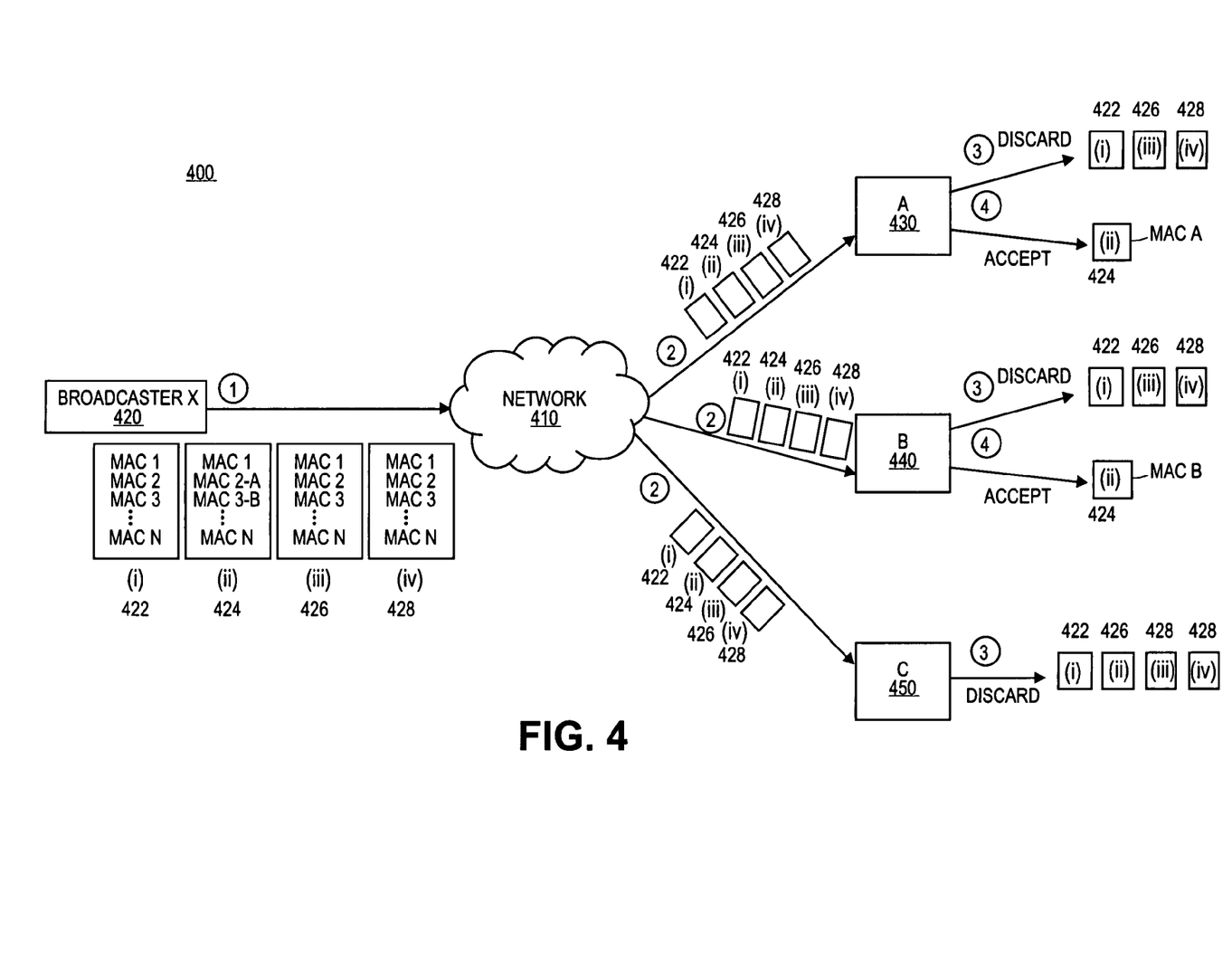
FIG. 4 is a block diagram depicting one exemplary embodiment of broadcast stenography between a broadcaster and multiple recipients.

FIG. 4 is a block diagram depicting one exemplary embodiment of a broadcast stenography process carried out between a broadcaster and multiple recipients. System 400 depicts broadcaster X 420 communicating with recipient A 430, recipient B 440, and recipient C 450 via network 410. In one embodiment, broadcaster X 420 and recipients A 430, B 440, and C 450 perform methods 200 and 300 described with respect to FIGS. 2 and 3 above.

Broadcaster X 420 creates four messages: i 422, ii 424, iii 426, and iv 428. Messages i 422, ii 426, and iv 428 are all bogus messages with no intended recipients. Message ii 424 is a real or authentic message that is intended for recipients A 430 and B 440, but not for recipient C 450. Messages i 422, ii, 424, iii 426, and iv 428 each have unique pseudo-MACs associated with the messages. In addition, message ii 424 has 2 real MACs calculated using the message and the respective shared secret key between broadcaster X 420 and recipient A 430, and broadcaster x 420 and recipient B 440.

The messages i 422, ii 424, iii 426, and iv 428 are simultaneously sent via the network 410 to recipients A 430, B 440, and C 450. Each recipient 430, 440, 450 then calculates their own MAC for each received message based on the respective message and the shared secret key between the recipient 430, 440, 450 and the broadcaster X 420. Each recipient 430, 440, 450 then compares the calculated MAC for each message 422, 424, 426, 428 to the list of MACs sent with each message 422, 424, 426, 428.

As a result, recipient A 430 discards messages i 422, iii 426, and iv 428 as there were no matching MACs to the MAC calculated by recipient A 430. However, recipient A will accept message ii 424 as intended for recipient A 430 because the MAC calculated by recipient A 430 matches one of the MACs sent with the message.

Recipient B 440 also discards messages i 422, iii 426, and iv 428 as there were no matching MACs to the MAC calculated by recipient B 440. However, recipient B will accept message ii 424 as intended for recipient B 440 because the MAC calculated by recipient B 440 matches one of the MACs sent with the message.

Lastly, recipient C 450 will end up discarding all of the messages i 422, ii, 424, iii 426, and iv 428 as none of the MACs included with these messages match any of the MACs calculated for the messages by recipient C 450. As such, recipient C will not be able to tell that message ii 424 was actually a real message meant for recipients A 430 and B 440 due to the plurality of real and bogus messages 422, 424, 426, 428 sent in the communication, as well as due to the plurality of MACs included with each message 422, 424, 426, 428. For the same reasons, recipients A 430 and B 440 will not be able to tell which messages 422, 424, 426, 428 were meant or not meant for the other recipients.

In one embodiment, the broadcast stenography process described above may be applied to a secret sharing scheme. A secret sharing scheme is a cryptographic scheme that divides a secret into 'n' pieces (or shares) such that any 'k' of them (k<n) may be used to reconstruct the secret. For example, the secret may be a bulk encryption key used in an encryption scheme among multiple communicators.

The broadcast stenography process described above in embodiments of the invention may be utilized to distribute the shares to a subset of the recipients in an anonymous, but reliable, way. The broadcaster could take each share and run it through the secret sharing scheme, and then send the shares being distributed, along with several other fake shares, using the methods of the embodiments of the invention, such as those described with respect to FIG. 2. Each of the intended recipients would be able to reconstruct their shares using the methods of embodiments of the invention, such as those described with respect to FIG. 3.

To guard against brute-force recovery of the shares, the broadcaster should send enough shares (i.e., fake and real shares) to make reconstruction implausible. In some embodiments, the number of fake and real shares should be approximately equal. For example, the number of fake shares should be roughly equivalent to the number of bits in a comparable encryption key (e.g., 128 fake shares would provide approximately the same security as a bulk encryption algorithm using a 128 bit key, assuming the number of authentic shares was somewhere in the neighborhood of 128 shares also).

Figure 5:
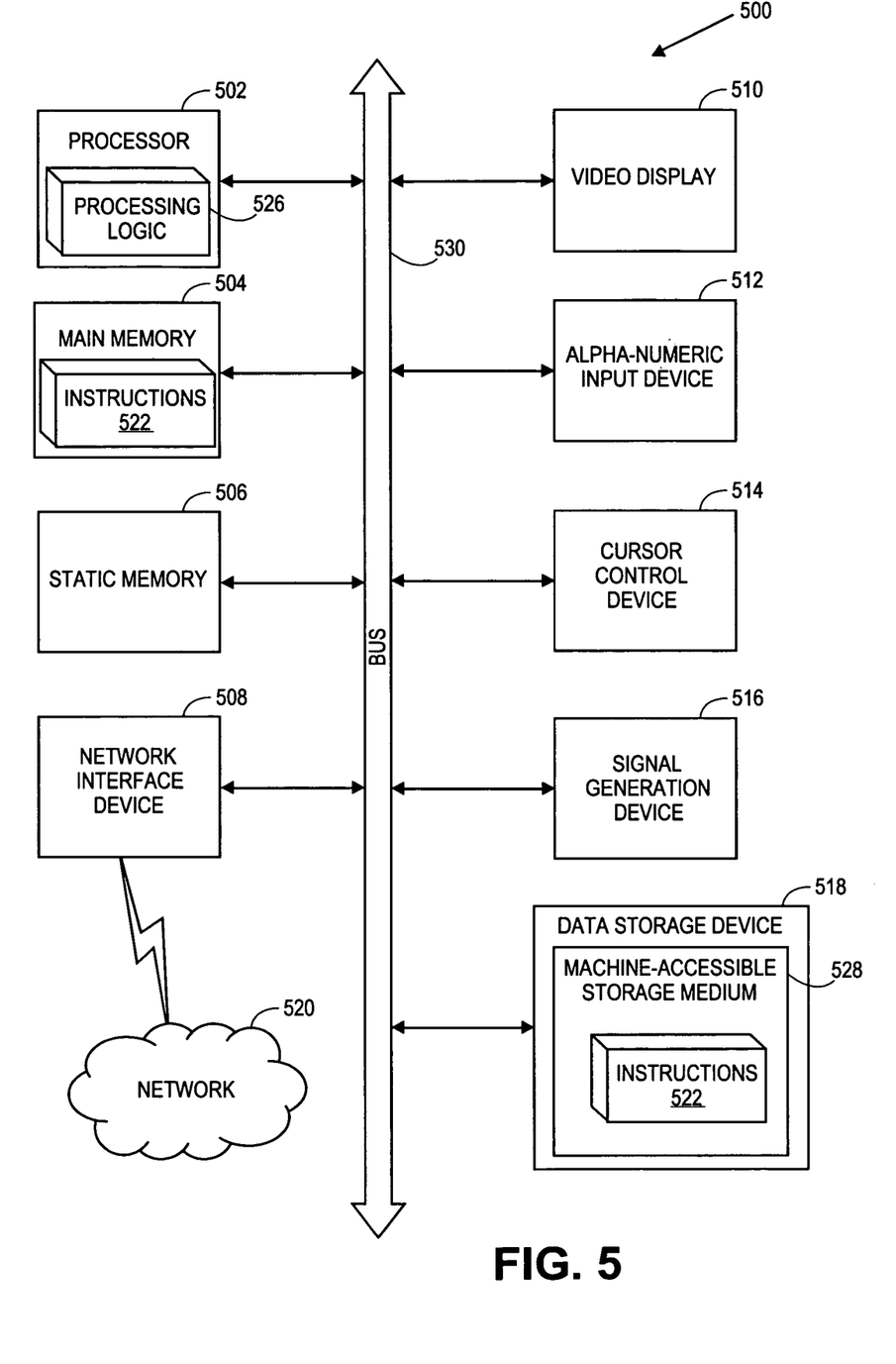
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508. In one embodiment, the network interface device 508 may be operable to receive messages from the broadcaster or the recipient as described above in various embodiments of the invention.

The machine-readable storage medium 528 may also be used to store a broadcast stenography module (e.g., broadcast stenography module 115 or 135 of FIG. 1), and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   receiving, by a computing device, an original message composed by a sender using the computing device, the original message directed to one or more recipients by the sender;
   creating, by the computing device, a plurality of fake messages for transmission with the original message, the plurality of fake messages having no intended recipients;
   for each of the one or more recipients of the original message, calculating, by the computing device, a message authentication code (MAC) in view of the original message and a shared secret key kept between the sender and the recipient;
   for each of the plurality of fake messages, creating pseudo-MACs that are unique to the fake message and comprise a format that is identical to the MAC calculated for the original message; and
   sending, by a network device of the computing device, to each of the one or more recipients:
     the original message with its associated calculated MACs and one or more of the pseudo-MACs; and
     the plurality of fake messages each with their associated pseudo-MACs.

2. The method of claim 1, wherein the shared secret key is created in view of a Diffie Hellman key exchange protocol.

3. The method of claim 1, wherein each of the one or more recipients holds a unique shared secret key with the sender.

4. The method of claim 1, wherein calculating the MAC for the original message further comprises applying the message and the shared secret key to a MAC algorithm agreed to by the broadcaster and the one or more recipients prior to the calculating.

5. The method of claim 1, wherein the method is applied to a secret sharing scheme for a bulk encryption key.

6. The method of claim 1, wherein the sending the original message with its associated calculated MACs and the plurality of fake messages each with their associated pseudo-MACs to the one or more recipients is performed via a multicast broadcasting scheme.

7. The method of claim 1, wherein each of the one or more recipients of the original message and the plurality of fake messages calculates another MAC for each of the plurality of messages received, the another MAC in view of the message and the shared secret key.

8. The method of claim 7, wherein a recipient of the one or more recipients determines that a message is intended for the recipient if the another MAC matches at least one of the MACs sent with the plurality of messages.

9. A method, comprising:
receiving, by a network interface device of a computing device from a broadcaster, a plurality of messages and a plurality of message authentication codes (MACs) each associated with one of the plurality of messages, the plurality of messages comprising a real message and a plurality of fake messages and the plurality of MACs comprising a real MAC associated with the real message and a plurality of pseudo-MACS associated with the plurality of fake messages, wherein the real message is sent with both the real MAC and one of more of the pseudo-MACs and the fake message is sent with one or more of the pseudo-MACs;
for each message of the plurality of messages:
calculating, by the computing device, another MAC from both of the message and a shared secret key kept between the broadcaster and a recipient of the message;
comparing, by the computing device, the calculated another MAC to the MAC of the plurality of MACs associated with the message for an identical match;
when there is an identical match, processing the message as real and intended for the recipient; and
when there is not an identical match, discarding the message as fake and not intended for the recipient.

10. The method of claim 9, wherein the plurality of pseudo-MACs have an identical format to the real MAC.

11. The method of claim 9, wherein the shared secret key is created in view of a Diffie Hellman key exchange protocol.

12. The method of claim 9, wherein calculating the another MAC further comprises applying the message and the shared secret key to a MAC algorithm agreed to by the broadcaster and the one or more recipients prior to the calculating.

13. The method of claim 9, wherein the message is part of a secret sharing scheme for a bulk encryption key.

14. The method of claim 9, wherein the recipient of the message is one of many recipients in a multicast broadcast of the message from the broadcaster and each of the recipients holds a unique shared secret key with the broadcaster.

15. The method of claim 9, further comprising keeping a record of the calculated another MAC of the message if it is intended for the recipient in order to guard against replays of the message.

16. A non-transitory machine-readable storage medium including instructions that, when accessed by a computing device, cause the computing device to perform operations comprising:
receiving, by the computing device, an original message composed by a sender using the computing device, the original message directed to one or more recipients by the sender;
creating, by the computing device, a plurality of fake messages for transmission with the original message, the plurality of fake messages having no intended recipients;
for each of the one or more recipients of the original message, calculating, by the computing device, a message authentication code (MAC) in view of the original message and a shared secret key kept between the sender and the recipient;
for each of the plurality of fake messages, creating pseudo-MACs that are unique to the fake message and comprise a format that is identical to the MAC calculated for the original message; and sending, by a network device of the computing device, to each of the one or more recipients;
the original message with its associated calculated MACs and one or more of the pseudo-MACs; and
the plurality of fake messages each with their associated pseudo-MACs.

17. The non-transitory machine-readable storage medium of claim 16, wherein the shared secret key is created in view of a Diffie Hellman key exchange protocol.

18. The non-transitory machine-readable storage medium of claim 16, wherein each of the one or more recipients holds a unique shared secret key with the broadcaster.

19. The non-transitory machine-readable storage medium of claim 16, wherein calculating the MAC further comprises applying the message and the shared secret key to a MAC algorithm agreed to by the broadcaster and the one or more recipients prior to the calculating.

20. The non-transitory machine-readable storage medium of claim 16, wherein the method is applied to a secret sharing scheme for a bulk encryption key.

21. An apparatus, comprising:
a memory;
a processing device communicably coupled to the memory;
a network device communicably coupled to the memory and the processing device, the network device to receive, from a broadcaster, a plurality of messages and a plurality of message authentication codes (MACs) each associated with one of the plurality of messages, the plurality of messages comprising a real message and a plurality of fake messages and the plurality of MACs comprising a real MAC associated with the real message and a plurality of pseudo-MACS associated with the plurality of fake messages, wherein the real message is sent with both the real MAC and one of more of the pseudo-MACs and the fake message is sent with one or more of the pseudo-MACs;
a MAC algorithm module executable from the memory by the processing device and communicably coupled to the network device, the MAC algorithm to calculate another MAC from both of the message and a shared secret key kept between the broadcaster and a recipient of the message; and
a broadcast stenography module executable from the memory by the processing device and communicably coupled to the network device and the MAC algorithm module, the broadcast stenography module to, for each message of the plurality of messages:
compare the calculated another MAC to the MAC of the plurality of MACs associated with the message for an identical match;
when there is an identical match, process the message as real and intended for the recipient; and
when there is not an identical match, discard the message as fake and not intended for the recipient.

22. The apparatus of claim 21, wherein the plurality of pseudo-MACs have an identical format to the real MAC.

23. The apparatus of claim 21, wherein the shared secret key is created in view of a Diffie Hellman key exchange protocol.

24. The apparatus of claim 21, wherein the MAC algorithm module to calculate the another MAC further comprises applying the message and the shared secret key to a MAC algorithm agreed to by the broadcaster and the one or more recipients prior to the calculating.

25. The apparatus of claim 21, wherein the broadcast stenography module further to keep a record of the calculated another MAC of the message if it is intended for the recipient in order to guard against replays of the message.

* * * * *